United States Patent

[11] 3,572,780

| [72] | Inventor | David Levin<br>Nassau, Bahamas |
|---|---|---|
| [21] | Appl. No. | 841,922 |
| [22] | Filed | July 15, 1969 |
| [45] | Patented | Mar. 30, 1971 |
| [73] | Assignee | Abbey Manufacturing Company Limited<br>Dublin, Ireland |
| [32] | Priority | July 16, 1968 |
| [33] |  | Ireland |
| [31] |  | 851/68 |

[54] LOCKING DEVICE
5 Claims, 5 Drawing Figs.

[52] U.S. Cl.................................................. 287/20,
287/119, 287/56
[51] Int. Cl.................................................. F16b 9/00
[50] Field of Search.......................................... 287/20, 56,
54.1, 55, 119—136; 292/204, 304, 256, 257;
285/309, 312, 308, 326; 24/(Inquired); 279/19.1,
89; 269/(Inquired)

[56] References Cited
UNITED STATES PATENTS

| 599,109 | 2/1898 | Pletcher...................... | 292/304 |
| 1,852,056 | 4/1932 | Mears et al.................. | 292/204 |
| 3,356,395 | 12/1967 | Dygert et al................. | 287/54.1 |

FOREIGN PATENTS

| 1,038,874 | 8/1966 | Australia..................... | 292/L&H |

Primary Examiner—David J. Williamowsky
Assistant Examiner—Wayne L. Shedd
Attorney—Kurt Kelman, ABSTRACT: A locking device for further securing together two component parts of a domestic appliance in which one of the component parts is provided with a retaining recess with a rotatable bar mounted therein and the second component is provided with an insert member having a groove therein, operation of the device being carried out by locating the insert member in the retaining recess and engaging the bar member in the groove of the insert member.

Inventor
DAVID LEVIN

By Kurt Kelman
Agent

Inventor

By

Agent

LOCKING DEVICE

This invention relates to a locking device and in particular to a locking device which is particularly suited for releasably securing together component parts of domestic appliances and the like light engineering products. The locking device of the present invention may be used in any assembly work, even in heavy engineering but for the sake of simplicity the many spheres of application of the locking devices will be referred to collectively as "a domestic appliance."

Locking devices at present in use for assembly work generally require the utilization of screws and/or nuts and bolts, which is recognized as a disadvantage when simple and rapid replacement of a relevant component part is required. The present invention is directed towards providing a locking device which allows two component parts to be quickly assembled and/or taken apart. The locking device is particularly suited for use with domestic appliances which have a plurality of attachments and where alternate use of the different attachments is required. Accordingly, the present invention provides a locking device for further securing together two component parts of a domestic appliance in which one of the component parts is provided with a retaining recess to locate and secure an insert member provided on the second component part said locking device comprising an axially rotatable bar member mounted in the retaining recess and having an eccentrically offset axial portion which, when the bar member is rotated, moves towards the insert member in an arc normal to the axis of the bar member, a groove for the reception of the eccentric portion of the bar member being provided in the insert member, the said groove extending lengthwise on the insert member parallel to the bar member and extending in depth into said insert member in an arc approximating to the arc in which the eccentric portion of the bar member moves.

The invention will be more clearly understood from the following description of a preferred embodiment thereof given by way of example only with reference to the accompanying drawings in which.

Figure 1:
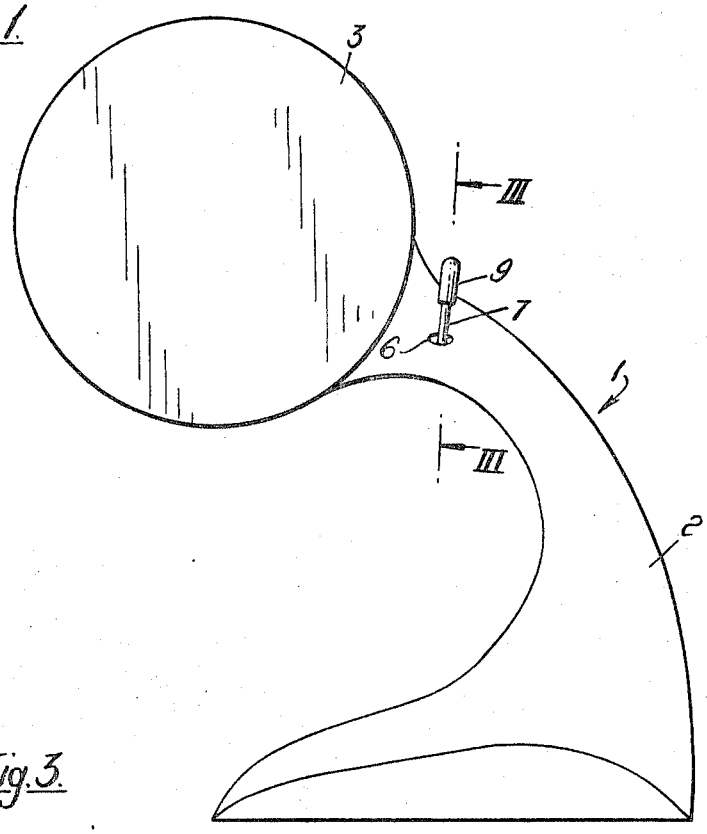
FIG. 1 is a perspective view of a domestic food processing machine.
Figure 3:
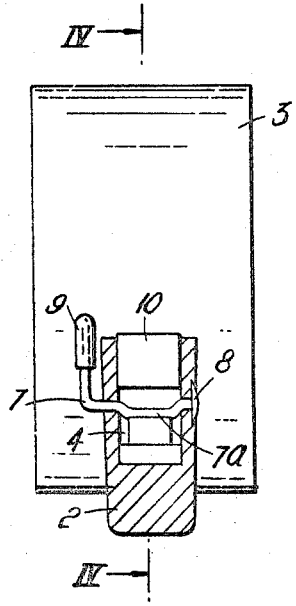
FIG. 3 is a section on the line III-III of FIG. 1.
Figure 4:
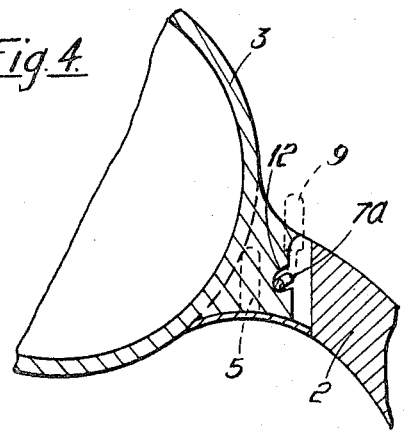
FIG. 4 is a section on the line IV-IV of FIG. 3 with the locking device in the locked position.
Figure 2:
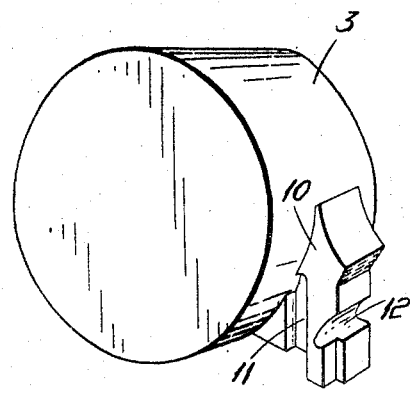
FIG. 2 is a diagrammatic perspective view of the domestic food processing machine with the vase and head members separated to illustrate the locking device.
Figure 5:
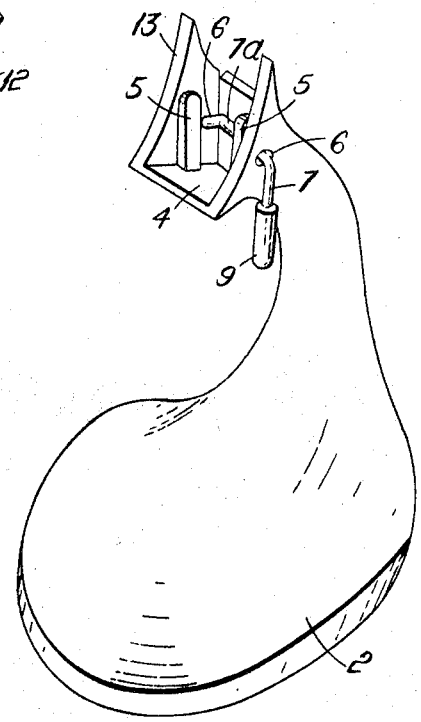
FIG. 5 is a section on the line IV-IV of FIG. 3 with the locking device in the open position.
Figure 5:
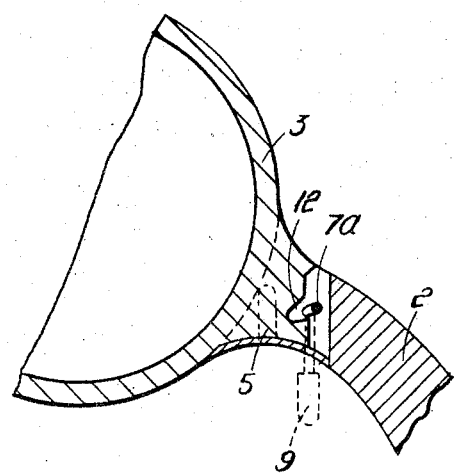

Referring to the drawings the domestic food processing machine 1 comprises two main parts namely the base member 2 and the head member 3. The upper portion of the base member 2 is formed with a retaining recess 4 having substantially vertical guide members 5. Further, the side walls of the retaining recess 4 are provided with holes 6 of a suitable size to allow the location and mounting in the retaining recess 4 of a bar member 7. The bar member 7 is especially shaped so that the center axial portion 7 a thereof is eccentrically offset from the portions of the bar member 7 which pass through the holes 6. Further the bar member 7 is retained in position in the retaining recess 4 by means of a stud 8 and an handle 9, which are themselves external of the retaining recess 4. When the bar member is rotated, say by moving the handle 9 in an anticlockwise direction, the eccentrically offset axial portion 7 a moves in an arc normal to the axis of the bar member 7.

The head member 3 which comprises a cylindrical drum, housing the food processing apparatus, is provided with an insert member 10 having substantially vertical slots 11 and a transverse groove 12. The groove 12 is for reception of the eccentric portion 7 a of the bar member 7 and it will be understood that the groove 12, which extends lengthwise on the insert member 10 parallel to the bar member 7, extends in depth into the insert member 10 in an arc approximating to the arc in which the eccentric portion 7 a of the bar member 7 moves on rotation of the bar member 7. It will be understood that the abutting parts of the retaining recess 4 and the insert member 10 are designed to be complementary to ensure a correct location of the insert member 10 in the retaining recess 4 for operation of the locking device; for example the edge portions 13 of the sidewalls of the retaining recess 4 are suitably curved to engage the outer surface of the cylindrical drum of the head member 3.

In operation the insert member 10 is inserted into the retaining recess 4 with the guide members 5 engaging the slots 11, the center portion 7 a of the bar member 7 being located adjacent to rear wall 14 of the retaining recess 4 and the handle 9 being downwardly inclined. The handle member 9 is turned anticlockwise to move the center portion 7 a of the bar member 7 both upward into the retaining recess 4 and then inwardly and downwardly to engage the groove 12 and secure together the base member 2 and the head member 3. It will be appreciated that the greater the anticlockwise movement of the handle 9 the firmer the engagement between the bar member 7 and the groove 12. In order to release the head member 3 from the base member 2 the handle is turned clockwise to impart the reverse movement to the bar member 7 and return the center portion 7 a of the bar member 7 to the position adjacent the bottom of the retaining recess 4.

In use it is preferable that the diameter of the arc of the groove 12 is slightly less than the diameter of the arc in which the eccentric portion 7 a of the bar member 7 moves on rotation of the bar member 7. In this manner as closure of the locking device is near completion one achieves a snug fit between the bar member 7 and the groove 12 to draw the components 2 and 3 together and obtain a rigid assembly. The action of drawing the components 2 and 3 together in the first instance and then securing the assembly in a rigid manner is a progressive action in that the greater the depth of insertion of the bar member eccentric portion 7 a into the groove 12 the further the tightening and locking action of the device has proceeded.

It is also envisaged that a snug fit between the bar member 7 and the groove 12 may be achieved by having the width of the groove 12 at its inner end equal to or slightly less than the diameter of the bar member 7.

We claim:

1. A locking device for further securing together two component parts of a domestic appliance in which one of the component parts is provided with a retaining recess to locate and secure an insert member provided on the second component part said locking device comprising an axially rotatable bar member mounted in the retaining recess and having an eccentrically offset axial portion which, when the bar member is rotated, moves towards the insert member in an arc normal to the axis of the bar member, a groove for the reception of the eccentric portion of the bar member being provided in the insert member, the said groove extending lengthwise on the insert member parallel to the bar member and extending in depth into said insert member in an arc approximating to the arc in which the eccentric portion of the bar member moves.

2. A locking device as claimed in claim 1 in which the diameter of the arc of the retaining groove is slightly less than the diameter of the arc in which the eccentric portion of the bar member moves whereby a snug fit between the bar member and the groove is achieved on closure of the device.

3. A locking device as claimed in claim 1 in which the width of the groove at its inner end is equal to or slightly less than the diameter of the eccentric portion of the bar member whereby a snug fit between the bar member and the groove is achieved on closure of the device.

4. A locking device as claimed in claim 1 in which the retaining device is provided with vertical guide members which engage complementary grooves in the insert member to locate and retain the insert member within the recess.

5. A locking device as claimed in claim 1 in which the retaining recess is provided with sidewalls, said sidewalls having holes therein for the mounting of the bar member, the bar member being shaped so that the center portion thereof is offset from the portions of the bar member which pass through the holes in the sidewalls of the recess.